(12) United States Patent
Toyooka et al.

(10) Patent No.: US 8,887,083 B2
(45) Date of Patent: Nov. 11, 2014

(54) GENERATING EQUATIONS BASED ON USER INTENT

(75) Inventors: Takashi Toyooka, Ottawa (CA); Christian M. R. Delbaere, Ottaway (CA); Anil P. Balaram, Nepean (CA)

(73) Assignee: Synopsys, Inc., Mountain View, CA (US)

( * ) Notice: Subject to any disclaimer, the term of this patent is extended or adjusted under 35 U.S.C. 154(b) by 882 days.

(21) Appl. No.: 12/694,930

(22) Filed: Jan. 27, 2010

(65) Prior Publication Data

US 2011/0185307 A1    Jul. 28, 2011

(51) Int. Cl.
*G06F 17/50*    (2006.01)
*G06F 17/11*    (2006.01)
*G06F 17/10*    (2006.01)

(52) U.S. Cl.
CPC ........................ *G06F 17/10* (2013.01)
USPC ............................. 715/780; 715/762; 715/711

(58) Field of Classification Search
CPC ................................. G06F 17/50; G06F 17/11
USPC .................................................. 715/780, 762
See application file for complete search history.

(56) References Cited

U.S. PATENT DOCUMENTS

| | | | |
|---|---|---|---|
| 5,251,292 A * | 10/1993 | Martel et al. .................. | 715/236 |
| 5,680,638 A * | 10/1997 | Satoh ............................ | 715/204 |
| 6,934,910 B2 * | 8/2005 | Lange .......................... | 715/267 |
| 2005/0050470 A1 * | 3/2005 | Hudson et al. ................ | 715/711 |
| 2006/0282818 A1 * | 12/2006 | DeSpain ....................... | 717/109 |
| 2007/0180013 A1 * | 8/2007 | Yung ............................ | 708/446 |
| 2008/0244403 A1 * | 10/2008 | Kaneko ........................ | 715/711 |
| 2008/0307373 A1 * | 12/2008 | Kobayashi ....................... | 716/4 |
| 2009/0210466 A1 * | 8/2009 | Katayama .................... | 708/136 |
| 2011/0077916 A1 * | 3/2011 | Cohn et al. ....................... | 703/2 |
| 2011/0131261 A1 * | 6/2011 | Jacobson et al. ............. | 708/131 |
| 2011/0276947 A1 * | 11/2011 | Delbaere et al. ............. | 717/125 |
| 2011/0294524 A1 * | 12/2011 | Tontinuttananon et al. .. | 455/458 |

OTHER PUBLICATIONS

Bernd Held; Microsoft Excel Functions & Formulas; 2007; Wordware Publishing, Inc.; pp. 321-341.*

* cited by examiner

*Primary Examiner* — Daeho Song
(74) *Attorney, Agent, or Firm* — Park, Vaughan, Fleming & Dowler LLP; Chia-Hsin Suen (57) ABSTRACT

Some embodiments provide a system that facilitates the creation of an equation. During operation, the system obtains a user selection of a function to be used in the equation. Next, the system determines a state of a graphical user interface (GUI) associated with a software program. More specifically, the system may determine a cursor position or a text selection in the equation. Finally, the system facilitates the creation of the equation by inserting the function into the equation based at least on the determined state.

18 Claims, 5 Drawing Sheets

GENERATING EQUATIONS BASED ON USER INTENT

BACKGROUND

1. Field

The present embodiments relate to techniques for generating equations. More specifically, the present embodiments relate to a method and system for generating equations for processing by software programs based on user intent.

2. Related Art

Electronic design automation (EDA) software is routinely used during circuit design and validation. After performing simulations, users of EDA software often post-process output waveforms using user-supplied equations, which are typically provided or specified using a user interface. For example, users may provide an equation through an EDA user interface by typing commands in a calculator-style equation editor using a user-interface device, such as a keyboard. Alternatively, users may select an equation by selecting graphical objects that are displayed in a graphical user interface (GUI), for example, in a so-called 'wizard-style' interface.

However, each of these existing approaches can be difficult to use. For example, in order to use an equation editor, users typically must first learn the allowed commands and the associated syntax. Furthermore, entering equations into an equation editor typically requires manual, incremental user input, which can be tedious and lead to errors in expressing the equation. For example, a user's incremental insertion of functions and arguments into an equation may cause arguments and/or functions within the equation to be incorrectly placed and/or nested.

Consequently, the difficulty and tedium associated with specifying equations in existing EDA software may adversely impact customer satisfaction, customer retention, and sales.

SUMMARY

Some embodiments provide a system that facilitates the creation of an equation. During operation, the system obtains a user selection of a function to be used in the equation. Next, the system determines a state of a graphical user interface (GUI) associated with a software program. More specifically, the system may determine a cursor position or a text selection in the equation. Finally, the system facilitates the creation of the equation by inserting the function into the equation based at least on the determined state.

If the determined state corresponds to a text selection, the system may insert the function into the equation by wrapping the function around the text selection and updating the cursor position based at least on the number of arguments used by the function. If the number of arguments is equal to one, the text selection is used as the sole argument of the function and the cursor position is moved to the end of the function. If the number of arguments is greater than one, the text selection is used as the first argument of the function and the cursor position is moved to the end of a comma appended to the text selection.

For example, the determined state may include a text selection of "v(in)" in equation 224. If an "abs" function with one argument is selected by the user, equation-generation apparatus 214 may update "v(in)" with "abs(v(in))." However, if the user selects a "max" function with two arguments, equation-generation apparatus 214 may update "v(in)" with "max(v(in),)" and place the cursor in between the comma and the closing parenthesis of "max."

If the determined state corresponds to a cursor position in the equation, the cursor position's association with a part of the equation is used to insert the function. If the cursor position is within or adjacent to an argument, the function is wrapped around the argument. If the cursor position is within or adjacent to a function name of the existing function or immediately after the end of the existing function, the function is wrapped around an existing function in the equation. If the cursor position is at the end of the equation, the function is wrapped around the entire equation. If the cursor position is not associated with an argument or existing function, the function is inserted at the cursor position.

For example, a "max" function may be selected for insertion into an expression containing "cos(x+y)−z." If the cursor position is adjacent to any of the first three letters (e.g., "cos") of the expression or after the closing parenthesis, the expression may be changed to "max(cos(x+y),)−z." If the cursor position is adjacent to the "x," the expression may be changed to "cos(max(x,)+y)−z." If the cursor position is after the "z," the expression may be changed to "max(cos(x+y)−z,)." In all of the examples, the cursor may be placed between the comma and the closing parenthesis of the "max" function. Finally, if the cursor position is adjacent to either the "+" or "−" operators, the "max" function may be inserted at the cursor position with no arguments, and the cursor may be placed between the opening and closing parentheses of the "max" function.

In some embodiments, the user selection of the function is obtained through the GUI.

In some embodiments, the software program is an electronic design automation (EDA) application.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
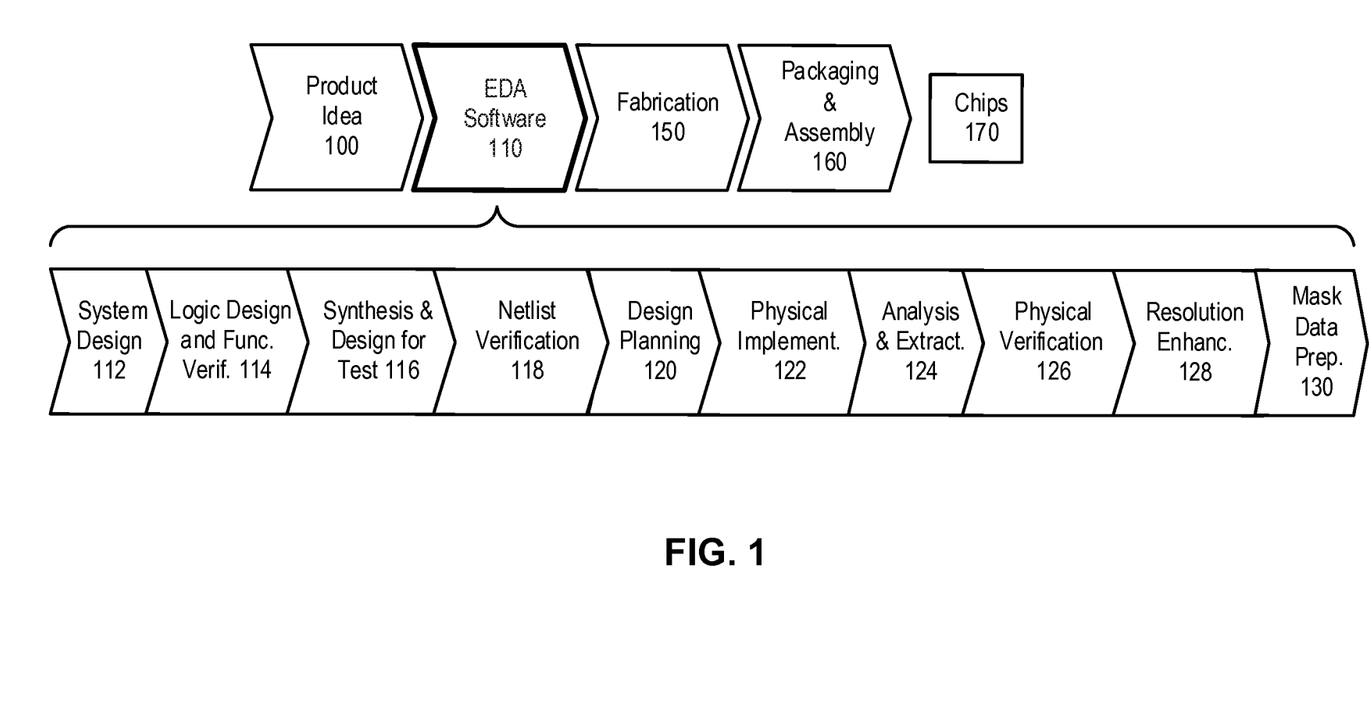
FIG. 1 shows a workflow associated with the design and fabrication of an integrated circuit in accordance with an embodiment.

FIG. 1 shows a workflow associated with the design and fabrication of an integrated circuit in accordance with an embodiment. The workflow may begin with a product idea (step 100), which may be realized using an integrated circuit that is designed using an electronic design automation (EDA) process (step 110). After the integrated circuit design is finalized, the design may undergo a fabrication process (step 150) and a packaging and assembly process (step 160) to produce chips 170.

The EDA process (step 110) includes steps 112-130, which are described below for illustrative purposes only and are not meant to limit the present invention. Specifically, the steps may be performed in a different sequence than the sequence described below.

During system design (step 112), circuit designers may describe the functionality to be implemented in the integrated circuit. They may also perform what-if planning to refine functionality, check costs, etc. Hardware-software architecture partitioning may also occur at this stage.

During logic design and functional verification (step 114), the VHDL or Verilog code for modules in the system may be written and the design may be checked for functional accuracy, (e.g., the design may be checked to ensure that it produces the correct outputs).

During synthesis and design for test (step 116), the VHDL/Verilog may be translated to a netlist. Further, the netlist may be optimized for the target technology, and tests may be designed and implemented to check the finished chips.

During netlist verification (step 118), the netlist may be checked for compliance with timing constraints and for correspondence with the VHDL/Verilog source code.

During design planning (step 120), an overall floorplan for the chip may be constructed and analyzed for timing and top-level routing. During physical implementation (step 122), circuit elements may be positioned in the layout (placement) and may be electrically coupled (routing).

During analysis and extraction (step 124), the circuit's functionality may be verified at a transistor level and parasitics may be extracted. During physical verification (step 126), the design may be checked to ensure correctness for manufacturing, electrical issues, lithographic issues, and circuitry.

During resolution enhancement (step 128), geometric manipulations may be performed on the layout to improve manufacturability of the design. During mask data preparation (step 130), the design may be "taped-out" to produce masks that are used during fabrication.

Embodiments of the present invention can be used in one or more of the above-described steps. Embodiments of the present invention have been described in this disclosure for illustrative purposes only. Specifically, even though some illustrative examples are described in the context of an EDA software application, it will be apparent to one of ordinary skill in the art that the present invention is not limited to software applications in the EDA space. Specifically, embodiments of the present invention can be used in any software application which enables a user to iteratively create an equation.

Figure 2:
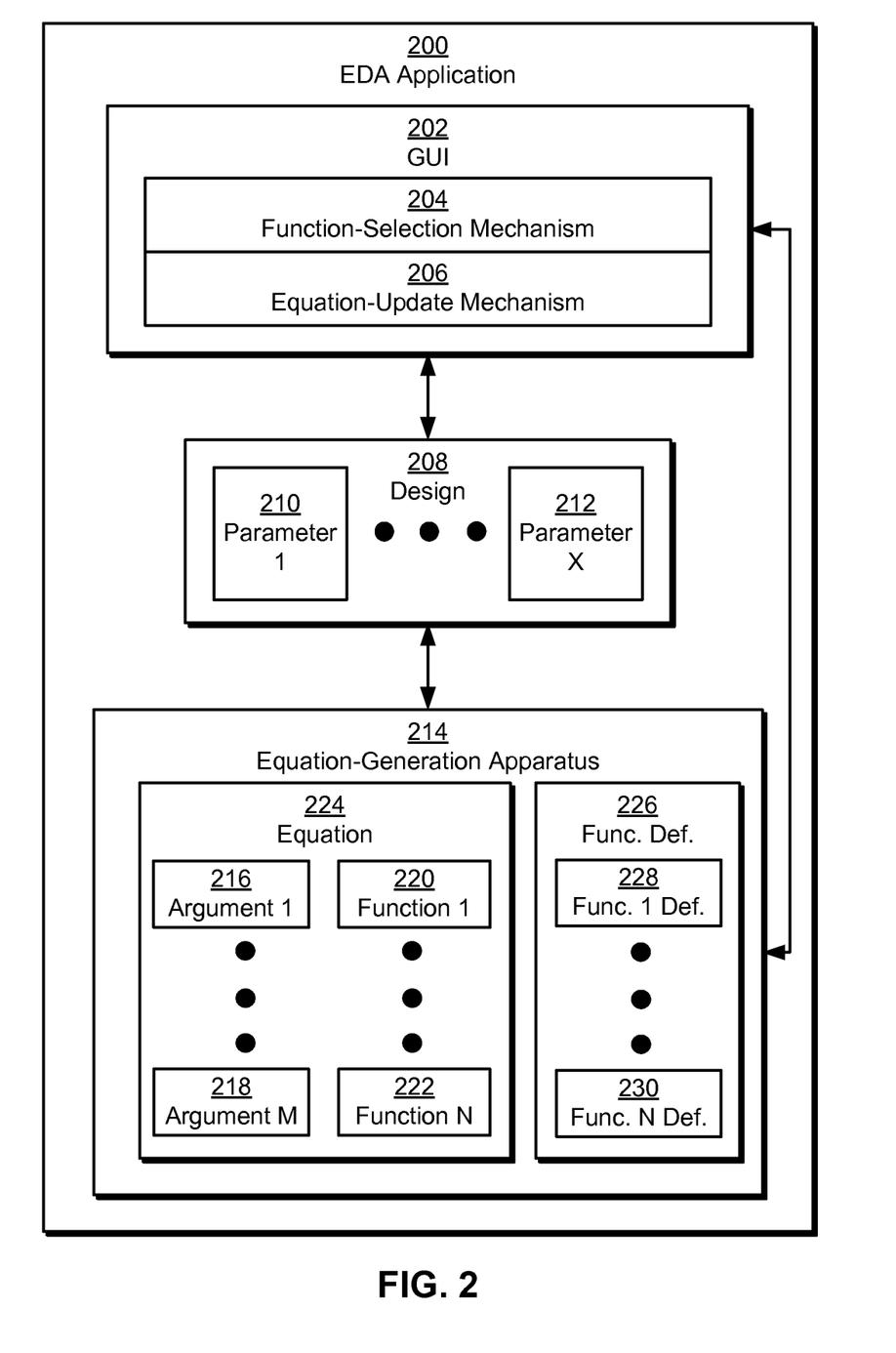
FIG. 2 shows an electronic design automation (EDA) application in accordance with an embodiment.

FIG. 2 shows an EDA application 200 in accordance with an embodiment. As shown in FIG. 2, EDA application 200 includes a graphical user interface (GUI) 202, a design 208, and an equation-generation apparatus 214. Each of these components is described in further detail below.

Design 208 may correspond to an abstract representation of an integrated circuit that uses graphical objects to represent components in the integrated circuit. For example, design 208 may correspond to a schematic or layout of the integrated circuit. Design 208 may contain symbols that represent resistors, capacitors, transistors, logic gates, and/or other components in the integrated circuit. The graphical objects may additionally be connected by lines that represent power and signal connections between the components. In other words, the functionality of the integrated circuit may be illustrated by the components and interconnections within design 208.

Design 208 may be created using EDA application 200. For example, EDA application 200 may correspond to a schematic and/or layout editor that allows a user to create design 208 on a computer system. Consequently, design 208 may correspond to a schematic and/or layout of the integrated circuit, with cells in design 208 representing components in the integrated circuit and nets in design 208 representing the interconnections. In addition, instances of cells may be associated with one or more electrical parameters (e.g., parameter 1 210, parameter x 212), such as voltage, current, power, conductivity, frequency response, and/or other qualities associated with the behavior of the integrated circuit.

The creation of design 208 may also involve the use of an equation 224. In particular, equation 224 may be used to process the results of one or more simulations of design 208 performed by EDA application 200. For example, equation 224 may include mathematical and/or signal processing functions to facilitate the visualization and/or analysis of the simulation results by the user. The user may then update design 208 based on the output of equation 224.

In one or more embodiments, equation 224 is created using GUI 202. For example, GUI 202 may include an equation-update mechanism 206 that displays equation 224 to the user and allows the user to add text corresponding to equation 224 using a keyboard, mouse, and/or other input device. In addition, the user may build equation 224 incrementally by adding a series of functions (e.g., function 1 220, function n 222) and arguments (e.g., argument 1 216, argument m 218) to equation 224. Function definitions 226 can specify the number and type of arguments for each function, e.g., function 1 definition 228 can specify the number and type of arguments required for function 1 220, function N definition 230 can specify the number and type of arguments required for function N 222. For example, the user may construct an equation containing three functions by adding a first function and two electrical parameters (e.g., parameter 1 210, parameter x 212) as arguments of the first function, wrapping a second function around the first function (e.g., using the first function as the sole argument of the second function), and wrapping a third function around the second function and adding one or more additional arguments to the third function.

Those skilled in the art will appreciate that the manual, incremental creation of equation 224 may be tedious and/or error-prone. First, the text-based entry of functions and arguments into equation 224 may require that the user learn the available functions in EDA application 200 as well as the associated syntax. Moreover, the user may incorrectly enter, place, and/or nest functions and arguments in equation 224, causing EDA application 200 to process equation 224 in an unintended way and/or return a syntax error.

To facilitate the creation of equation 224, EDA application 200 may include mechanisms for inferring user intent as functions and/or arguments are added to equation 224. As shown in FIG. 2, equation 224 is created within EDA application 200 using equation-generation apparatus 214. Equation-generation apparatus 214 may create and/or modify equation 224 based at least on user input obtained through GUI 202. In other words, the creation and/or update of equation 224 by equation-generation apparatus 214 may be based on one or more factors that include user input obtained through GUI 202.

In particular, the user may interact with a function-selection mechanism 204 in GUI to provide input associated with the creation and/or modification of equation 224. For example, function-selection mechanism 204 may display a set of graphical objects representing functions for use in equation 224 and/or a list of hyperlinks to the functions. To add functions to equation 224, the user may select the graphical objects and/or hyperlinks using a mouse, keyboard, and/or other input device. Function-selection mechanism 204 may also allow the user to select graphical objects representing cell instances, terminals, and/or nets. Parameters (e.g., parameter 1 210, parameter x 212) associated with the selected graphical objects may then be used as arguments to the functions. Function-selection mechanism 204 may also allow the user to input functions and/or arguments into equation 224 using keyboard shortcuts, voice commands, and/or other input methods.

After the user specifies a function through function-selection mechanism 204, equation-generation apparatus 214 may infer the user's intent by determining the state of GUI 202 during the user's selection of the function. In particular, equation-generation apparatus 214 may determine the state as a cursor position and/or text selection in equation 224. For example, equation-generation apparatus 214 may examine equation-update mechanism 206 to identify the placement of a cursor within equation 224 and/or a text selection in equation 224 by the user.

Next, equation-generation apparatus 214 may facilitate the creation of equation 224 by inserting the function into equation 224 based at least on the determined state of GUI 202. If the determined state corresponds to a text selection in equation 224, equation-generation apparatus 214 may wrap the function around the text selection and update the cursor position based at least on the number of arguments used by the function. If the number of arguments is equal to one, equation-generation apparatus 214 may use the text selection as the sole argument of the function and move the cursor position to the end of the function. If the number of arguments is greater than one, equation-generation apparatus 214 may use the text selection as the first argument of the function and move the cursor position to the end of a comma appended to the text selection to allow the user to select or enter additional arguments.

For example, the determined state may include a text selection of "v (in)" in equation 224. If an "abs" function with one argument is selected by the user, equation-generation apparatus 214 may update "v (in)" with "abs (v(in))." However, if the user selects a "max" function with two arguments, equation-generation apparatus 214 may update "v (in)" with "max (v(in),)" and place the cursor in between the comma and the closing parenthesis of "max."

On the other hand, if the determined state corresponds to a cursor position in equation 224, equation-generation apparatus 214 may insert the function based at least on the proximity of the cursor to an existing function and/or argument in equation 224. In particular, equation-generation apparatus 214 may wrap the function around an argument if the cursor position is within or adjacent to the argument and wrap the function around an existing function in the equation if the cursor position is within or adjacent to a function name of the existing function or immediately after the end of the existing function. In addition, equation-generation apparatus 214 may wrap the function around equation 224 if the cursor position is at the end of equation 224 or insert the function at the cursor position if the cursor position is not associated with an argument or an existing function in equation 224. As with text selections, equation-generation apparatus 214 may update the cursor position based on the number of arguments used by the function.

For example, a "max" function may be selected for insertion into equation 224, which contains the expression "cos (x+y)-z." If the cursor position is adjacent to any of the first three letters (e.g., "cos") of the expression or after the closing parenthesis, the expression may be changed to "max (cos (x+y),)-z." If the cursor position is adjacent to the "x," the expression may be changed to "cos(max (x,)+y)-z." If the cursor position is after the "z," the expression may be changed to "max (cos (x+y)-z,)." In all of the examples, the cursor may be placed between the comma and the closing parenthesis of the "max" function. Finally, if the cursor position is adjacent to either the "+" or "-" operators, the "max" function may be inserted at the cursor position with no arguments, and the cursor may be placed between the opening and closing parentheses of the "max" function.

By leveraging user intent, EDA application 200 may insert functions and position the cursor in equation 224 in a manner that reduces error, confusion, and/or tedium during the creation of equation 224. Moreover, the use of graphical objects, hyperlinks, and/or other input mechanisms to add functions and/or arguments to equation 224 may allow the user to create equation 224 without extensive knowledge of the available functions in EDA application 200 and/or the associated syntax. In other words, EDA application 200 may facilitate the user's understanding of the use and placement of functions and arguments within equation 224 which, in turn, may facilitate the creation of equation 224.

Those skilled in the art will appreciate that equations may be used in a variety of domains. Consequently, the functionality of GUI 202 and equation-generation apparatus 214 may be applicable to other software and/or hardware environments, such as numerical computing environments, computational software, simulation environments, graphing calculators and software, spreadsheets, formula editors, and/or data analysis software.

Figure 3:
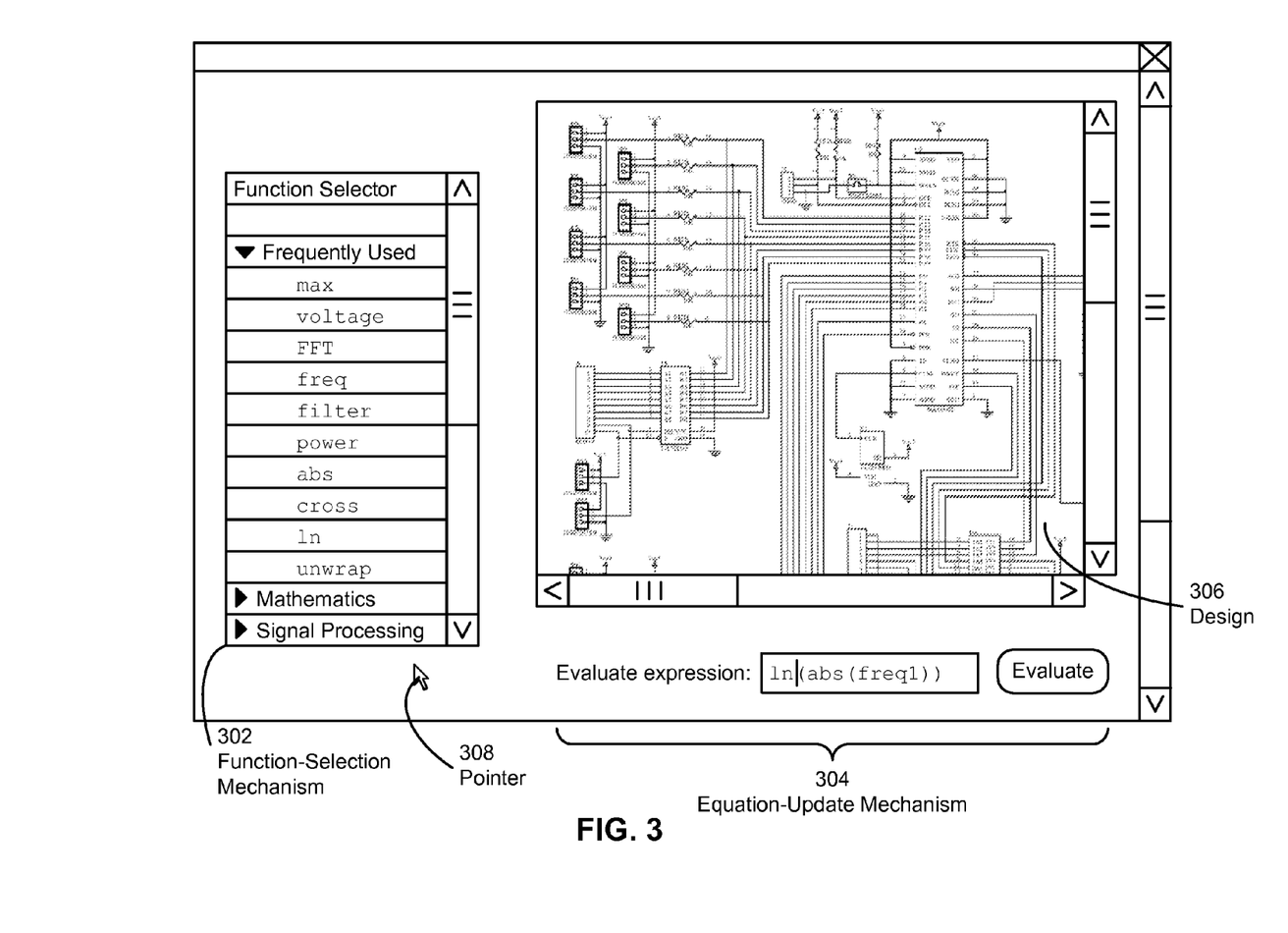
FIG. 3 shows an exemplary screenshot in accordance with an embodiment.

FIG. 3 shows an exemplary screenshot in accordance with an embodiment. More specifically, FIG. 3 shows a screenshot of a GUI for an EDA application, such as GUI 202 of FIG. 2. The GUI of FIG. 3 may allow a user of the EDA application to create an equation, such as equation 224 of FIG. 2. The equation may be used during the creation of a design 306, which is displayed within the GUI. For example, the equation may be used to process the results of one or more simulations of design 306.

To create the equation, the user may interact with a function-selection mechanism 302 and/or an equation-update mechanism 304 provided by the GUI. As shown in FIG. 3, equation-update mechanism 304 displays a field containing an expression (e.g., "ln(abs (freq1))") corresponding to the equation, with a cursor positioned after the "in" in the expression. Within the expression, "freq1" may be an argument of the "abs" function, and the "abs" function may be an argument of the "ln" function. Equation-update mechanism 304 may allow the user to edit the equation directly within the field. For example, the user may modify the equation by typing on the keyboard, using keyboard shortcuts, and/or copying and pasting text using a pointer 308.

The user may also select functions for use in the equation within function-selection mechanism 302. Function-selection mechanism 302 may organize and display the functions that are available in the EDA application. In particular, function-selection mechanism 302 may organize the functions into user- and/or application-configured categories (e.g., "Frequently Used," "Mathematics," "Signal Processing"). To view and/or hide the functions within a particular category, the user may select a drop-down element to the left of the category (e.g., using pointer 308). Within the screenshot, the functions in the "Frequently Used" category are displayed, while the functions in the "Mathematics" and "Signal Processing" categories are hidden.

To add a function to the equation using function-selection mechanism 302, the user may select the area of function-selection mechanism 302 corresponding to the function. For example, the user may insert the "max" function into the equation by clicking on the cell displaying "max" in function-selection mechanism 302 using pointer 308. The "max" function may then be inserted into the equation based at least on the cursor position in equation-update mechanism 304. In particular, the "max" function may wrap around the entire expression because the cursor is adjacent to the outermost "in" function in the expression. Because the "max" function may contain more than one argument, the cursor may be positioned between a comma appended to the end of the "in" function and the closing parenthesis of the "max" function. For example, the insertion of the "max" function may modify the expression in equation-update mechanism 304 to "max (ln(abs(freq1)),)," with the cursor positioned to the left of the last parenthesis in the expression.

Similarly, the user may select graphical objects within design 306 to add electrical parameters as arguments to functions in the equation. For example, the user may add an electrical parameter from a cell instance to the equation by clicking on the cell instance in design 306 and/or inputting a keyboard shortcut while pointer 308 is placed over the cell instance. If the cell instance contains only one electrical parameter, the electrical parameter may be automatically added to the equation. If the cell instance contains multiple electrical parameters, the GUI may display a drop-down menu that allows the user to select the electrical parameter to be used in the equation.

In other words, the GUI may allow the user to efficiently find and add functions and/or arguments to the equation. Furthermore, the GUI may facilitate the creation of the equation by inserting functions such that the user better understands the placement, nesting, and/or ordering of functions and arguments in the equation.

Figure 4:
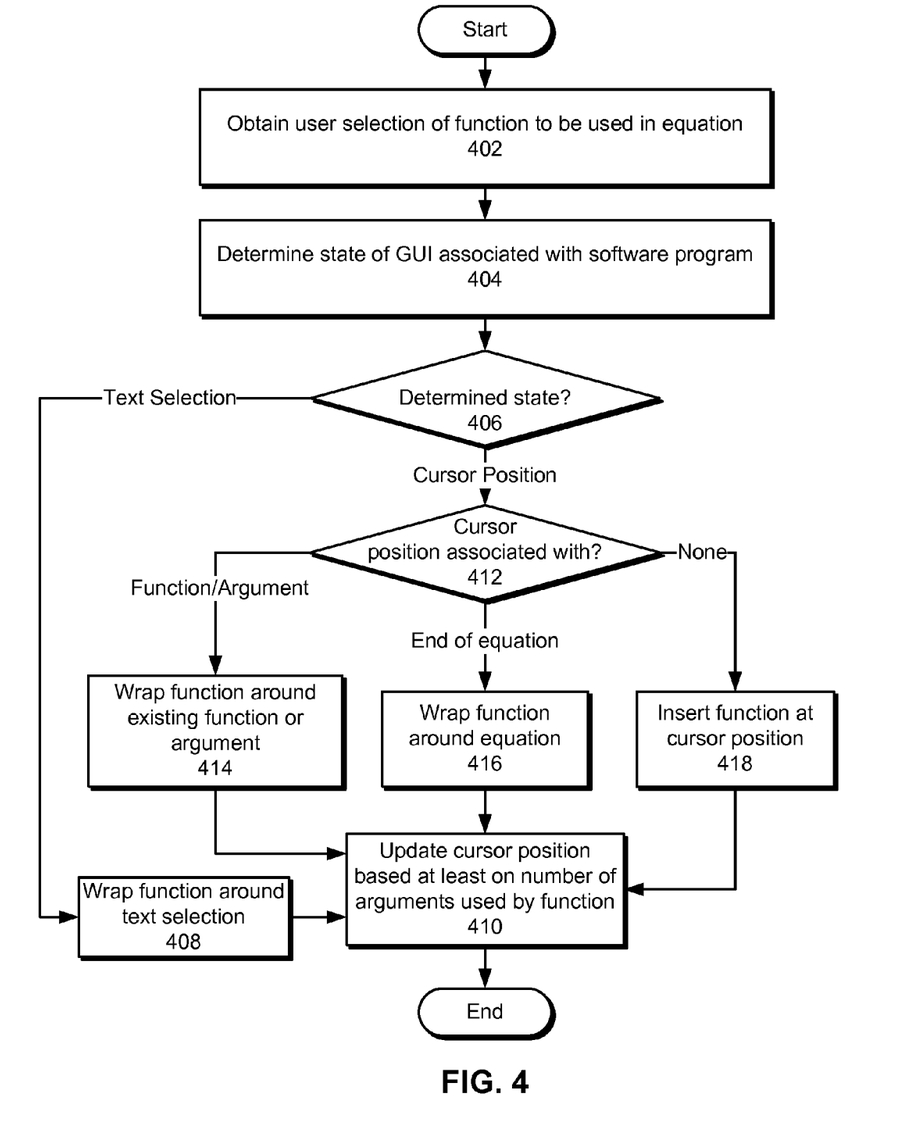
FIG. 4 shows a flowchart illustrating the process of facilitating the creation of an equation in accordance with an embodiment.

FIG. 4 shows a flowchart illustrating the process of facilitating the creation of an equation in accordance with an embodiment. In one or more embodiments, one or more of the steps may be omitted, repeated, and/or performed in a different order. Accordingly, the specific arrangement of steps shown in FIG. 4 should not be construed as limiting the scope of the embodiments.

First, a user selection of a function to be used in the equation is obtained (operation 402). The user selection may be provided through a GUI associated with a software program. For example, the function may be selected by clicking on a graphical object and/or hyperlink corresponding to the function, providing a keyboard shortcut, and/or using a voice or visual command.

Next, the state of the GUI is determined (operation 404). The state may correspond to a cursor position or a text selection in the equation. Furthermore, the determined state (operation 406) may be used to facilitate the creation of the equation. In particular, the determined state may represent user intent regarding the insertion of the function into the equation. As a result, the function may be inserted into the equation based at least on the determined state of the GUI.

If the determined state corresponds to a text selection in the equation, the function is wrapped around the text selection (operation 408), and the cursor position is updated based at least on a number of arguments used by the function (operation 410). The cursor position may be moved to the end of the function if the number of arguments is equal to one, or the cursor position may be moved to the end of a comma appended to the text selection if the number of arguments is greater than one.

On the other hand, if the determined state corresponds to a cursor position in the equation, the cursor position's association with a part of the equation (operation 412) is used to insert the function. If the cursor position is associated with (e.g., within or adjacent to) an existing function or argument, the function is wrapped around the existing function or argument (operation 414). For example, the function may be wrapped around an existing function if the cursor position is within or adjacent to the function name of the existing function or immediately after the end (e.g., closing brace or parenthesis) of the existing function. If the cursor position is at the end of the equation, the function is wrapped around the entire equation (operation 416). Finally, if the cursor position is not associated with an argument or existing function, the function is inserted at the cursor position (operation 418). For example, the function may be inserted at the cursor position if the equation is empty or if the cursor position is adjacent to an operator in the equation. Once the function is added to the equation (e.g., by wrapping the function around an argument), the cursor position may be updated based at least on the number of arguments used by the function (operation 410). For example, the cursor position may be moved to the end of the function if the function does not take any arguments, or inside the function's brackets if the number of arguments is equal to one, or the end of a comma appended to the first argument if the number of arguments is greater than one.

Once the function is inserted into the equation, the user may continue adding other functions and/or arguments to the equation. As a result, the flowchart of FIG. 4 may be repeated every time a new function is added to the equation.

Figure 5:
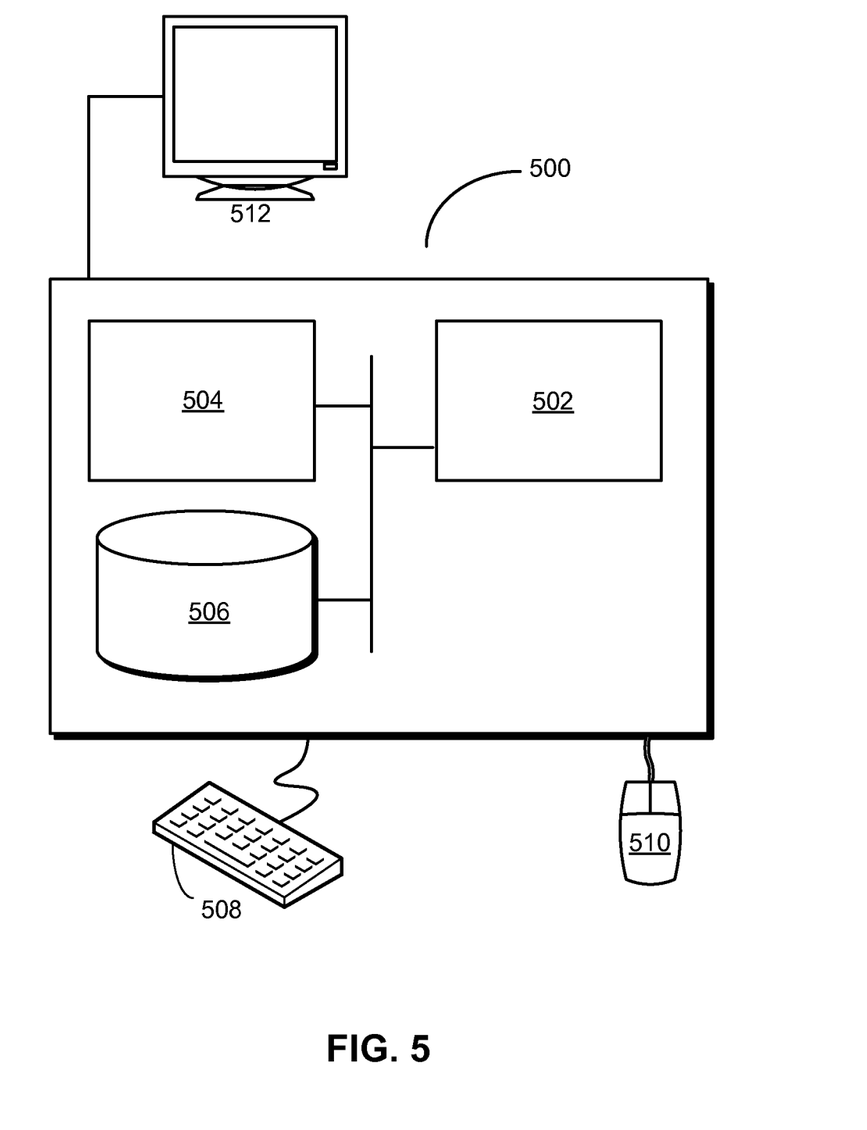
FIG. 5 shows a computer system in accordance with an embodiment.

FIG. 5 shows a computer system 500 in accordance with an embodiment. Computer system 500 includes a processor 502, memory 504, storage 506, and/or other components found in electronic computing devices. Processor 502 may support parallel processing and/or multi-threaded operation with other processors in computer system 500. Computer system

500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for facilitating the incremental creation of an equation by a user. The equation may be used in a software program such as an EDA application. The system may include a GUI that displays the equation to the user and obtains a user selection of a function to be used in the equation. The system may also include an equation-generation apparatus that determines a state of the GUI corresponding to a cursor position or a text selection in the equation. The equation-generation apparatus may also facilitate the creation of the equation by inserting the function into the equation based at least on the determined state to obtain a modified equation. Finally, the GUI may display the modified equation to the user.

In addition, one or more components of computer system 500 may be remotely located and connected to the other components over a network. Portions of the present embodiments (e.g., GUI, equation-generation apparatus, etc.) may also be located on different nodes of a distributed system that implements the embodiments. For example, the present embodiments may be implemented using a cloud computing system that enables the creation of designs on a remote EDA application.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating the creation of an equation, comprising:
   obtaining a user selection of a function to be used in the equation;
   determining a state of a graphical user interface (GUI) associated with a software program, wherein the state corresponds to a text selection in the equation, wherein the text selection is not associated with a current cursor position;
   facilitating, by computer, the creation of the equation by inserting the function into the equation based at least on the determined state; and
   displaying the created equation to the user.

2. The computer-implemented method of claim 1, wherein inserting the function into the equation based at least on the determined state involves:
   wrapping the function around the text selection; and
   updating a cursor position based at least on the number of arguments used by the function.

3. The computer-implemented method of claim 2, wherein updating the cursor position based at least on the number of arguments used by the function involves:
   moving the cursor position to the end of the function if the number of arguments is equal to one; and
   moving the cursor position to the end of a comma appended to the text selection if the number of arguments is greater than one.

4. The computer-implemented method of claim 1, wherein the user selection of the function is obtained through the GUI.

5. The computer-implemented method of claim 1, wherein the software program is an electronic design automation (EDA) application.

6. A system for facilitating the processing of an equation by a software program, comprising:
   a processor;
   a memory; and
   a graphical user interface (GUI) configured to obtain a user selection of a function to be used in the equation; and
   an equation-generation apparatus configured to:
      determine a state of the GUI, wherein the state corresponds to text selection in the equation, wherein the text selection is not associated with a current cursor position;
      facilitate the creation of the equation by inserting the function into the equation based at least on the determined state; and
      display the created equation to the user.

7. The system of claim 6, wherein inserting the function into the equation based at least on the determined state involves:
   wrapping the function around the text selection; and
   updating a cursor position based at least on the number of arguments used by the function.

8. The system of claim 7, wherein updating the cursor position based at least on the number of arguments used by the function involves:
   moving the cursor position to the end of the function if the number of arguments is equal to one; and
   moving the cursor position to the end of a comma appended to the text selection if the number of arguments is greater than one.

9. The system of claim 6, wherein the user selection of the function is obtained using at least one of a GUI element and a keyboard shortcut.

10. The system of claim 6, wherein the software program is an electronic design automation (EDA) application.

11. A non-transitory computer-readable storage medium storing instructions that when executed by a computer cause the computer to perform a method for facilitating the processing of an equation by a software program, the method comprising:
   obtaining a user selection of a function to be used in the equation;
   determining a state of a graphical user interface (GUI) associated with the software program, wherein the state corresponds to a text selection in the equation, wherein the text selection is not associated with a current cursor position;
   facilitating the creation of the equation by inserting the function into the equation based at least on the determined state; and
   displaying the created equation to the user.

12. The non-transitory computer-readable storage medium of claim 11, wherein inserting the function into the equation based at least on the determined state involves:
   wrapping the function around the text selection; and
   updating a cursor position based at least on the number of arguments used by the function.

13. The non-transitory computer-readable storage medium of claim 12, wherein updating the cursor position based at least on the number of arguments used by the function involves:
  moving the cursor position to the end of the function if the number of arguments is equal to one; and
  moving the cursor position to the end of a comma appended to the text selection if the number of arguments is greater than one.

14. The non-transitory computer-readable storage medium of claim 11, wherein the user selection of the function is obtained through the GUI.

15. The non-transitory computer-readable storage medium of claim 11, wherein the software program is an electronic design automation (EDA) application.

16. A graphical user interface (GUI) for facilitating the processing of an equation in a software program, comprising:
  a non-transitory computer-readable storage medium storing instructions that, when executed by a processor, cause the GUI to:
    display the equation;
    obtain a user selection of a function to be used in the equation;
    insert the function into the equation based on a determined state, wherein the state corresponds to a text selection in the displayed equation, wherein
  the text selection is not associated with a current cursor position; and display the equation with the inserted function to the user.

17. The GUI of claim 16, wherein inserting the function into the equation based at least on the determined state involves:
  wrapping the function around the text selection; and
  updating a cursor position based at least on the number of arguments used by the function.

18. The GUI of claim 16, wherein the user selection of the function is obtained using at least one of a GUI element and a keyboard shortcut.

* * * * *

UNITED STATES PATENT AND TRADEMARK OFFICE
CERTIFICATE OF CORRECTION

PATENT NO. : 8,887,083 B2  
APPLICATION NO. : 12/694930  
DATED : November 11, 2014  
INVENTOR(S) : Takashi Toyooka et al.

Page 1 of 1

It is certified that error appears in the above-identified patent and that said Letters Patent is hereby corrected as shown below:

Title page, item (75) Inventors: Christian M. R. Delbaere, Ottaway, please delete the word, "Ottaway" and please insert the word --Ottawa--.

Signed and Sealed this  
Twelfth Day of May, 2015

Michelle K. Lee  
*Director of the United States Patent and Trademark Office*